(12) United States Patent
Zimmer et al.

(10) Patent No.: US 10,011,347 B2
(45) Date of Patent: Jul. 3, 2018

(54) IRREVERSIBLE ROLLER CLUTCH FOR PREVENTING BACK DRIVE

(71) Applicant: The Boeing Company, Chicago, IL (US)

(72) Inventors: David J. Zimmer, Kinkland, WA (US); Yevgeniy M. Gisin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 15/194,437

(22) Filed: Jun. 27, 2016

(65) Prior Publication Data

US 2017/0369154 A1 Dec. 28, 2017

(51) Int. Cl.
*B64C 13/06* (2006.01)
*G05G 5/04* (2006.01)
*G05G 1/40* (2008.04)

(52) U.S. Cl.
CPC ............. *B64C 13/06* (2013.01); *G05G 1/40* (2013.01); *G05G 5/04* (2013.01)

(58) Field of Classification Search
CPC .......... B64C 13/06; G05G 1/40; G05G 1/405; G05G 5/005; G05G 5/04
See application file for complete search history.

(56) References Cited

U.S. PATENT DOCUMENTS

| 3,232,124 | A | * | 2/1966 | Weber | F16D 71/00 |
| | | | | | 192/223.2 |
| 3,668,977 | A | * | 6/1972 | Beidler | F15B 15/24 |
| | | | | | 92/17 |
| 4,358,073 | A | * | 11/1982 | Eickmann | B64C 29/00 |
| | | | | | 244/12.1 |
| 4,834,225 | A | * | 5/1989 | Klopfenstein | B64C 13/28 |
| | | | | | 188/134 |
| 7,690,597 | B2 | * | 4/2010 | Cavalier | B64C 13/28 |
| | | | | | 244/213 |
| 8,960,031 | B2 | * | 2/2015 | Keech | B64C 5/02 |
| | | | | | 244/99.3 |
| 2011/0048147 | A1 | * | 3/2011 | Keech | B64C 5/02 |
| | | | | | 74/89.26 |
| 2016/0159457 | A1 | * | 6/2016 | Saint-Marc | B64C 13/04 |
| | | | | | 244/235 |
| 2017/0029092 | A1 | * | 2/2017 | Gemmati | B64C 13/06 |

FOREIGN PATENT DOCUMENTS

FR 3031083 A1 * 7/2016

OTHER PUBLICATIONS

Roller Clutch Tools [online], "Socket Wrenches" [retrieved on Jun. 27, 2016]. Retrieved from the Internet: <http://www.rollerclutchtools.net/socket-wrenches/>.
Ringspann [online], "Irreversible Locks IR, bidirectional acting backstop for assembly with connecting parts with rollers" [retrieved on Jun. 27, 2016]. Retrieved from the Internet: <http://www.ringspann.com/en/products/freewheels/irreversible-locks/bidirectional-acting-backstop-for-assembly-with-connecting-parts/irreversible-locks-ir>.

* cited by examiner

*Primary Examiner* — Joseph W Sanderson
(74) *Attorney, Agent, or Firm* — Haynes and Boone, LLP

(57) ABSTRACT

Systems and methods are provided for an irreversible clutch to prevent back-drive. The irreversible clutch may transfer torque and/or rotation received at a first end to a second end, but may not transfer torque and/or rotation received at the second end to the first end. The irreversible clutch may prevent unintended adjustment of one or more rudder pedals and/or a rudder pedal assembly.

20 Claims, 14 Drawing Sheets

US 10,011,347 B2

IRREVERSIBLE ROLLER CLUTCH FOR PREVENTING BACK DRIVE

TECHNICAL FIELD

The disclosure relates generally to aircraft control systems and more specifically to aircraft pedal adjustment systems.

BACKGROUND

Aircraft often include one or more rudder pedals that may control operation of one or more rudders. The one or more rudders may be located on a vertical stabilizer of the aircraft and may control or contribute to control of the aircraft. The position of the rudder pedals may be adjustable. Systems and methods are needed to control the adjustment of the rudder pedals.

SUMMARY

Systems and methods are disclosed herein for an irreversible clutch to prevent back-drive. In certain examples, an apparatus may be disclosed and may include a position adjustment and control system configured to receive an adjustment command from a user and provide an adjuster output responsive to receiving the adjustment command, and an irreversible clutch. The irreversible clutch may include an input end coupled to the position adjustment and control system and configured to receive the adjuster output, and an output end, where the irreversible clutch is configured to transfer the adjuster output received at the input end to the output end as a clutch output, and where the irreversible clutch is further configured to receive a back-drive input at the output end and prevent a transfer of the back-drive input received at the output end to the input end.

In certain other examples, a method may be disclosed. The method may include disposing the irreversible clutch between the rudder pedal position adjuster and the adjustable rudder pedal assembly, coupling the irreversible clutch to the rudder pedal position adjuster, and coupling the irreversible clutch to the adjustable rudder pedal assembly.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Aircraft may include one or more rudders. The rudders may be controlled by one or more rudder pedals. In certain examples, the rudders may be controlled by two rudder pedals, each configured to be operated by a pilot's foot. The position of the rudder pedals may be adjusted via one or more adjustment mechanisms. The adjustment mechanism may include a locked position preventing adjustment of the position of the rudder pedals and an unlocked position allowing adjustment of the position of the rudder pedals.

In certain examples, the rudder pedals may be operated while the adjustment mechanism is in the unlocked position. In certain such examples, the position of the rudder pedal may be inadvertently changed if the rudder pedals are operated while the adjustment mechanism is in the unlocked position. As such, a technique to prevent such inadvertent changing of the position of the rudder pedals may be desirable.

Figure 1:
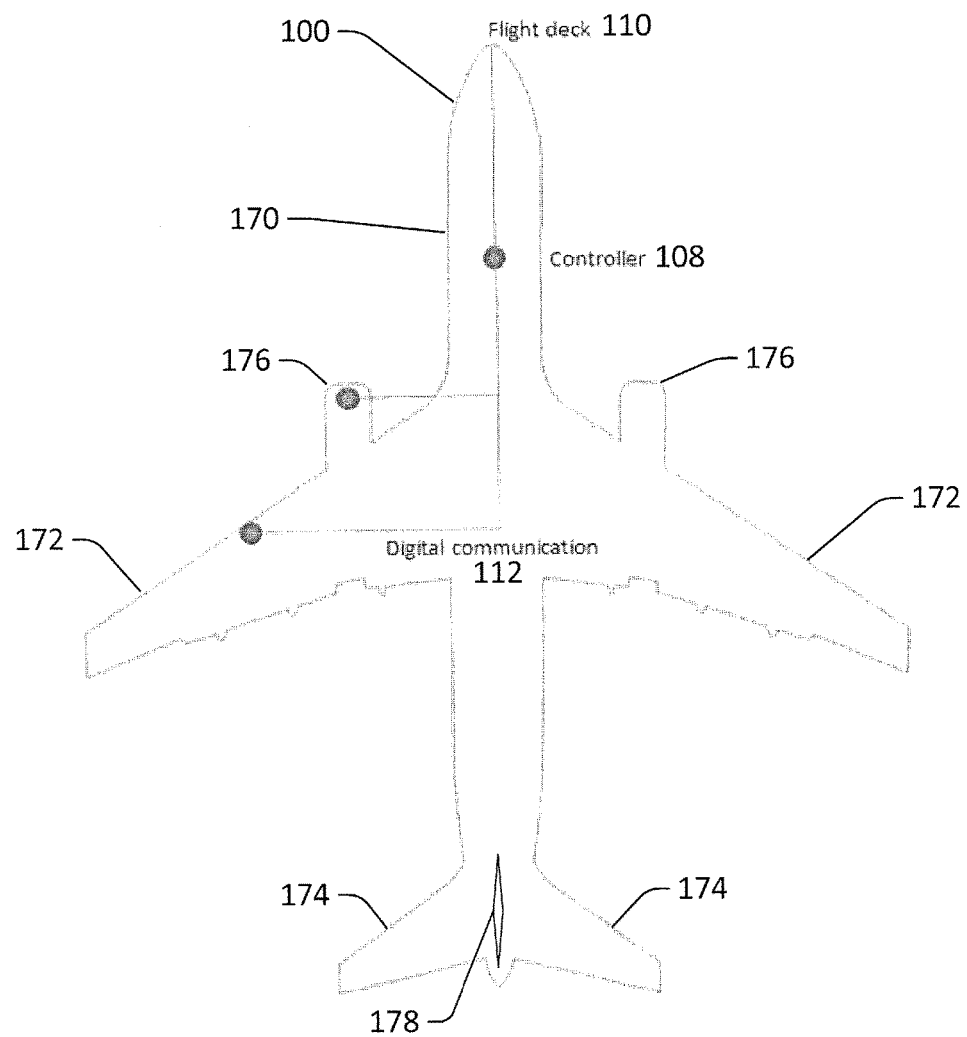
FIG. 1 illustrates an example aircraft in accordance with an example of the disclosure.

FIG. 1 illustrates an example aircraft in accordance with the disclosure. The aircraft 100 of FIG. 1 may include a fuselage 170, wings 172, horizontal stabilizers 174, aircraft engines 176, and a vertical stabilizer 178. The vertical stabilizer 178 may include one or more rudders. The rudders may be controlled by, for example, one or more rudder pedals operated by the pilot.

Additionally, the aircraft 100 may include a controller 108 and a flight deck 110. The various components of the aircraft 100 may be linked with digital communications 112 to communicate commands (e.g., issued by the controller 108, from instructions from the pilot, and/or issued by the controller 108 responsive to instructions from the pilot) and conditions detected. The aircraft 100 described in FIG. 1 is exemplary and it is appreciated that in other examples, the aircraft 100 may include less or additional components (e.g., no horizontal stabilizer or additional stabilizers). Additionally, concepts described herein may be extended to other aircraft such as helicopters, Unmanned Aerial Vehicles, etc.

The flight deck 110 of the aircraft 100 may include controls that may be manipulated by the pilot(s) of the aircraft 100 to provide instructions for the operation of the aircraft. For example, the flight deck 110 may include a control or controls for determining the throttle position or wing, horizontal stabilizer, and/or vertical stabilizer configuration of the aircraft (e.g., movement of the wings 172, horizontal stabilizers 174, and/or vertical stabilizer 178). In certain examples, the flight deck 110 may include an adjustable rudder pedal assembly. The position of the adjustable rudder pedal assembly may be controlled by a rudder pedal position adjuster. In certain examples, the adjustment of the position of the adjustable rudder pedal assembly, via the rudder pedal position adjuster, may be purely mechanical, but other embodiments may be electro-mechanical (e.g., the rudder pedal position adjuster may convert adjustment commands into electrical signals, and the electrical signals may then be communicated to the controller 108 and/or an electrical motor to drive adjustment of the adjustable rudder pedal assembly).

The flight deck 110, the wings 172, the horizontal stabilizers 174, the vertical stabilizer 178, as well as other components, may be communicatively coupled through one or more digital communication channels 112. The digital communication channel 112 may, for example, be a wired communication circuit or a wireless communications system. The digital communication channel 112 may link the various components to the controller 108.

The controller 108 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 108 and/or its associated operations may be implemented as a single device or multiple devices (e.g., communicatively linked through wired or wireless connections such as the digital communication channel 112) to collectively constitute the controller 108.

The controller 108 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 108 may be adapted to execute instructions stored within the memory to perform various methods and processes described herein, including implementation and execution of control algorithms responsive to sensor and/or operator (e.g., flight crew) inputs.

Figure 2A:
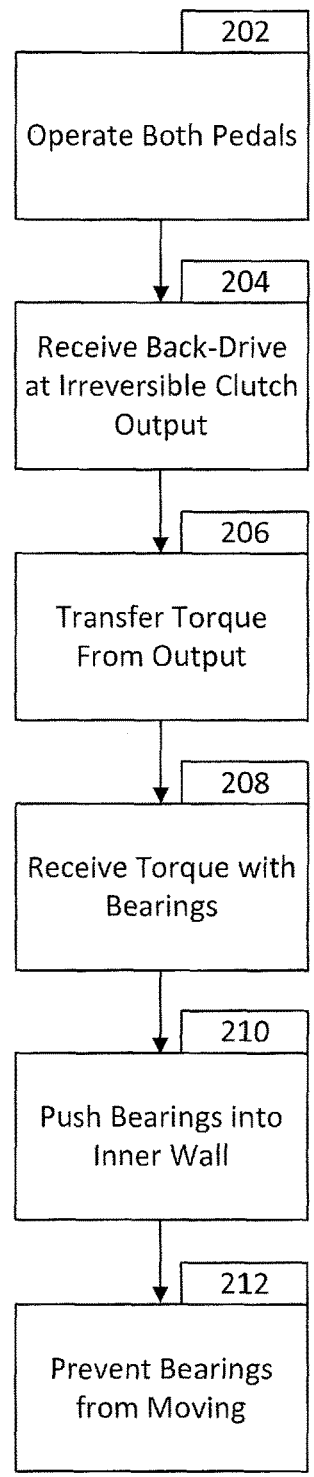
FIG. 2A illustrates a flowchart detailing operation of a rudder pedal adjustment mechanism receiving a back-drive in accordance with an example of the disclosure.
Figure 2B:
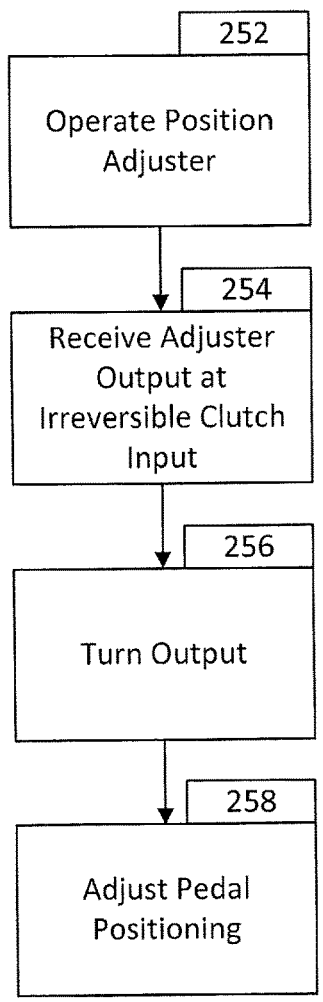
FIG. 2B illustrates a flowchart detailing operation of a rudder pedal adjustment mechanism receiving an adjustment command in accordance with an example of the disclosure.

FIGS. 2A and 2B illustrate examples of operations using the rudder pedal adjustment mechanism disclosed herein. The operations described in of FIGS. 2A and 2B may be performed by, for example, the rudder pedal adjustment mechanisms and components thereof described in FIGS. 3-11. In certain other examples, the operations, systems, apparatus, and components described herein may be used in non-aircraft applications. For example, other vehicles as well as the position of other items may be adjusted with the components (e.g., the irreversible clutch) described herein to prevent back drive. The techniques and systems described herein may be used in any application to prevent back drive.

FIG. 2A illustrates a flowchart detailing operation of a rudder pedal adjustment mechanism receiving a back-drive in accordance with an example of the disclosure. In block 202, both rudder pedals 302A and 302B may be operated at the same time. Operation of both the rudder pedals 302A and 302B may result in back-drive. In conventional rudder pedal assemblies, the back-drive may change the position of the rudder pedals if the rudder pedal assembly is unlocked. Additionally, while the back-drive in block 202 is generated by simultaneous operation of both of the rudder pedals 302A and 302B, other examples may generated the back-drive through other ways.

In block 204, the back-drive may be received by the irreversible clutch 414. The back-drive may be received at, for example, the output end 518 of the irreversible clutch 414, such as by the output 940. In certain examples, the back-drive may first turn or torque the adjustment shaft 306 and the adjustment shaft 306 may then transfer the torque to the output 940. In other examples, the back-drive may directly turn or torque the output 940.

In block 206, the output 940 may transfer the torque received. In certain examples, the back-drive may attempt to turn or torque the output 940. In block 208, turning or torqueing the output 940 may result in portions of the output 940 pressing against the bearings 626A-F (e.g., the flat portions of the output 940 may press against the bearings 626A-F). The bearings 626A-F may then be pressed against the inner wall 1146 in block 210. Friction from pressing the bearings 626A-F against the inner wall 1146 then prevents the bearings 626A-F and the output 940 from moving in block 212.

FIG. 2B illustrates a flowchart detailing operation of a rudder pedal adjustment mechanism receiving an adjustment command in accordance with an example of the disclosure. In block 252, the rudder pedal position adjuster 304 may be in the unlocked position and may be operated. Operation of the rudder pedal position adjuster 304 may create an adjuster output command. The adjuster output command may be, for example, rotation or torque that may then be transferred to the input end 520 of the irreversible clutch 414 at block 254.

The adjuster output may turn the input end 520 (e.g., turn the input 622). The input 622 may then rotate the output 940 and the intermediate connector 624 in block 256. In certain examples, the output 940 may rotate around the first rotational axis as well. The output 940 may then, for example, turn the adjustment shaft 306 and/or a portion of the jackshaft 308 to adjust the position of the rudder pedals 302A and/or 302B and/or the rudder pedal assembly in block 258.

Figure 3:
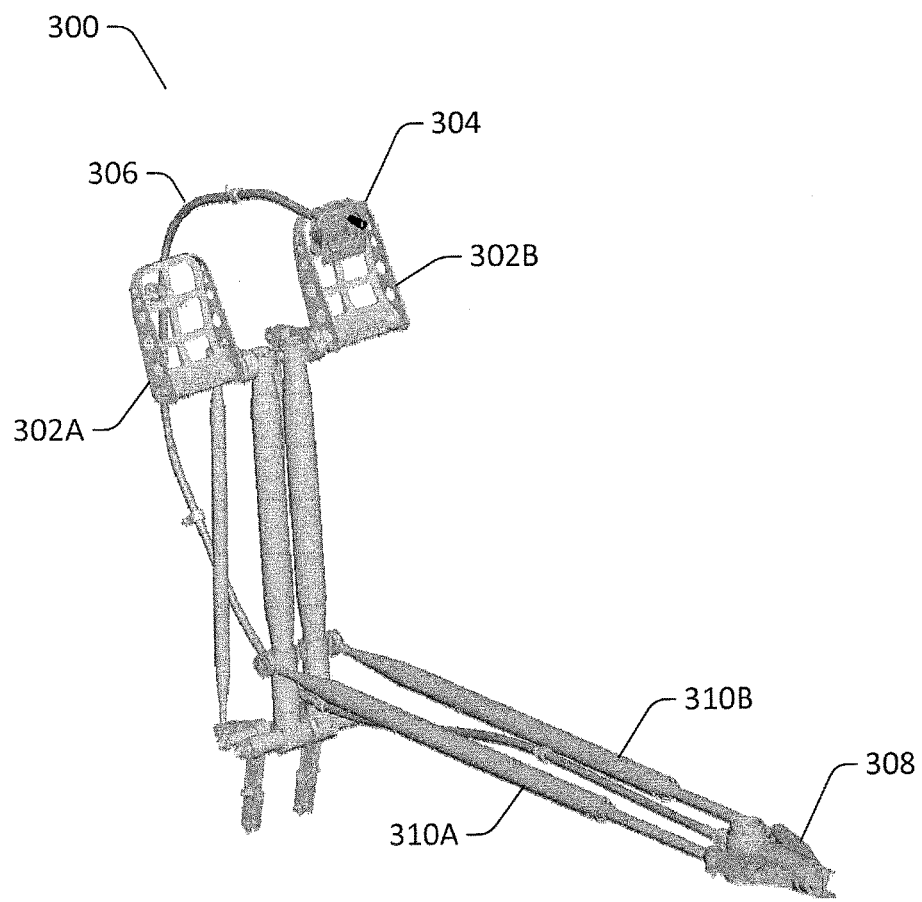
FIG. 3 illustrates an example position adjustment and control system in accordance with an example of the disclosure.

FIG. 3 illustrates an example position adjustment and control system in accordance with an example of the disclosure. The position adjustment and control system shown in FIG. 3 may more specifically include a rudder pedal adjustment mechanism 300 with rudder pedals 302A and 302B, a rudder pedal position adjuster 304, an adjustment shaft 306, a jackshaft 308, and rudder pedal intermediate shafts 310A and 310B.

The rudder pedal position adjuster 304 may be coupled to the adjustment shaft 306. As used in this disclosure, "coupled" may refer to two items that are coupled in such a way that an input from one item may be transferred to the other. Items that are coupled may not need to be directly connected. In certain examples, the crank of the rudder pedal position adjuster 304 may be turned to adjust the position of the rudder pedals 302A and 302B. Turning the crank may rotate an adjuster drive of the rudder pedal position adjuster 304. Rotation of the adjuster drive may then rotate the adjustment shaft 306. Such rotation may turn a mechanism of the jackshaft 308 (e.g., an adjustment screw) and the mechanism or the jackshaft 308 may then change the position of the rudder pedals 302A and 302B.

In certain examples, the rudder pedals 302A and 302B may be a part of an adjustable rudder pedal assembly. The rudder pedal position adjuster 304 may adjust the position of the adjustable rudder pedal assembly and/or the rudder pedals 302A and 302B. As such, certain examples may adjust the positioning of the rudder pedals 302A and 302B by adjusting the position of the entire adjustable rudder pedal assembly, while other examples may adjust the position of the rudder pedals 302A and 302B by adjusting the position of each individual pedal or adjusting the position of just the pedals themselves.

Figure 4:
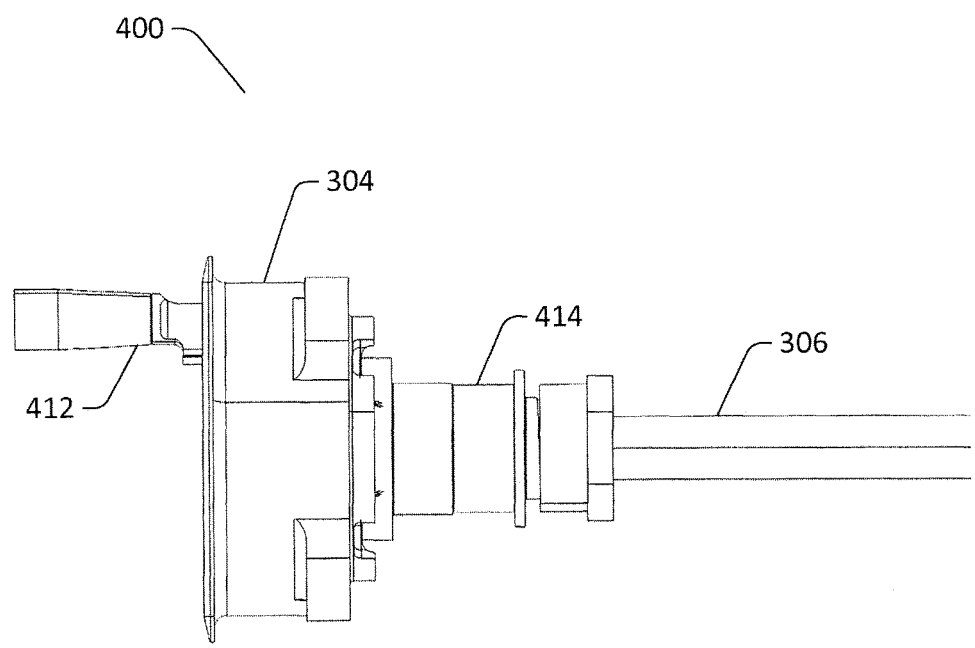
FIG. 4 illustrates an example rudder pedal position adjuster and irreversible clutch in accordance with an example of the disclosure.

In certain examples, the rudder pedal position adjuster 304 may include a flip out crank (not shown in FIG. 3, but shown in FIG. 4 as crank 412). The crank may include a plurality of positions, including a locked position stowing the crank and an unlocked position allowing for adjustment of the rudder pedals 302A and 302B. In the locked position, crank itself and/or the position of the rudder pedals 302A and 302B may be prevented from being adjusted and thus the position of the rudder pedals 302A and 302B may not be adjusted. In the unlocked position, the crank may be flipped out and the pilot and/or another user may operate the crank to adjust the position of the rudder pedals 302A and 302B.

A pilot may operate the rudder pedals 302A and/or 302B by, for example, pushing on the rudder pedals 302A and/or 302B. Force from pushing on the rudder pedals 302A and/or 302B may be transferred to the jackshaft 308 via the rudder pedal intermediate shafts 310A and 310B. The jackshaft 308 may then be moved, and such movement may be communicated as a command (e.g., mechanical movement of components that connect the jackshaft 308 to the rudder) to the rudders and/or the controller 108 of the aircraft 100. In examples where the jackshaft 308 communicates a command to the controller 108, the controller 108 may then issue a command to the rudders and/or the rudders may move according to the detected movement of the rudder pedals 302A and/or 302B. In certain examples, operation of both the rudder pedals 302A and 302B when the rudder pedal position adjuster 304 is unlocked (e.g., in the position allow for adjustment of the position of the rudder pedals 302A and 302B such as when the crank is flipped out) may allow for movement of the position of the rudder pedals 302A and 302B. Other examples may allow for movement of the position of the rudder pedals 302A and 302B due to other sources when the rudder pedal position adjuster 304 is unlocked. Such movement of the position of the rudder pedals 302A and 302B from sources other than input through the rudder pedal position adjuster 304 may be referred to as "back-drive."

FIG. 4 illustrates an example rudder pedal position adjuster and irreversible clutch in accordance with an example of the disclosure. FIG. 4 illustrates the rudder pedal position adjuster 304 with a crank 412, the adjustment shaft 306, and an irreversible clutch 414 disposed between the rudder pedal position adjuster 304 and the adjustment shaft 306.

In certain examples, the irreversible clutch 414 may include an input end coupled to the rudder pedal position adjuster 304 (e.g., the adjuster drive of the rudder pedal position adjuster 304) and an output end coupled to the adjustment shaft 306. In certain examples, both the input end and the output end may be configured to be turned and/or may turn any component coupled to the input end and/or the output end.

The irreversible clutch 414 may receive an adjuster output from the rudder pedal position adjuster 304 (e.g., an adjuster output corresponding to input received to adjust the position of the rudder pedals 302A and 302B such as one turn of the crank 412, two turns of the crank 412, or another amount of turns of the crank 412 or torque from turning the crank 412 at the input end and transfer the received adjuster output to the output end. The irreversible clutch 414 may provide a clutch output at the output end to the adjustment shaft 306 (e.g., may turn the adjustment shaft 306) responsive to receiving the adjuster output. As such, turning the input end of the irreversible clutch 414 may lead to rotation of the output end of the irreversible clutch 414 as well. The adjustment shaft 306 may accordingly also be turned and the position of the rudder pedals 302A and 302B may be adjusted from turning of the adjustment shaft.

Additionally, the irreversible clutch 414 may prevent back-drive. Accordingly, the irreversible clutch 414 may prevent adjustment of the position of the rudder pedals 302A and 302B due to back-drive. As such, the output end may receive a back-drive input. The irreversible clutch 414 may then not transfer the back-drive input to the input end. As such, back-drive may turn and/or torque the output end, but the input end may not turn or may only turn a minimal amount even though the output end is being turned and/or torqued.

Though the example in FIG. 4 shows the irreversible clutch 414 disposed between the rudder pedal position adjuster 304 and the adjustment shaft 306, other examples may dispose the irreversible clutch 414 between, for example, the adjustment shaft 306 and the jackshaft 308, or in another position.

In certain examples, the irreversible clutch 414 may be retrofitted onto existing aircraft. In certain such aircraft, the adjustment shaft 306 may be disconnected from the rudder pedal position adjuster 304 and/or the jackshaft 308 and the irreversible clutch 414 inserted between the adjustment shaft 306 and the position adjuster 304 and/or the jackshaft 308. The adjustment shaft 306 may then be coupled to the irreversible clutch 414 and the rudder pedal position adjuster 304 and/or the jackshaft 308 may be coupled to the irreversible clutch 414. In other examples, other or additional components may be connected to the irreversible clutch 414.

Figure 5:
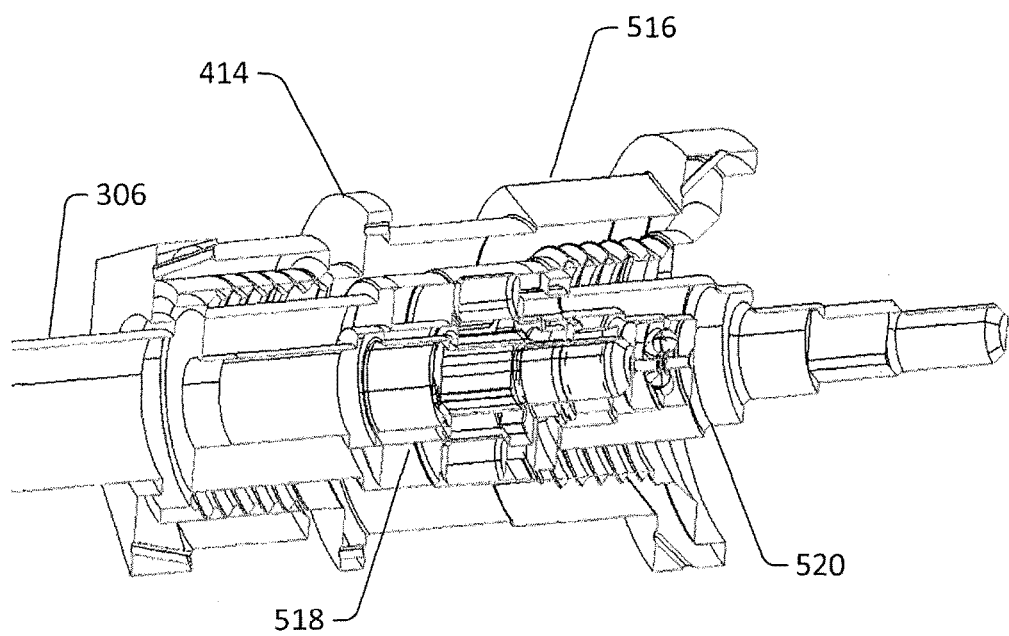
FIGS. 5, 6, 7, 8, 9A, 9B, 10, 11A, and 11B illustrate components of an example irreversible clutch in accordance with an example of the disclosure.

FIGS. 5-11 illustrate components of an example irreversible clutch in accordance with an example of the disclosure. FIG. 5 shows the irreversible clutch 414 and the adjustment shaft 306. The irreversible clutch 414 may include a clutch housing 516, an input end 520, and an output end 518. As shown in FIG. 5, the output end 518 may be coupled to the adjustment shaft 306. The input end 520 may be coupled to a rudder pedal position adjuster (not shown in FIG. 5, but shown in FIGS. 2-4).

Figure 6:
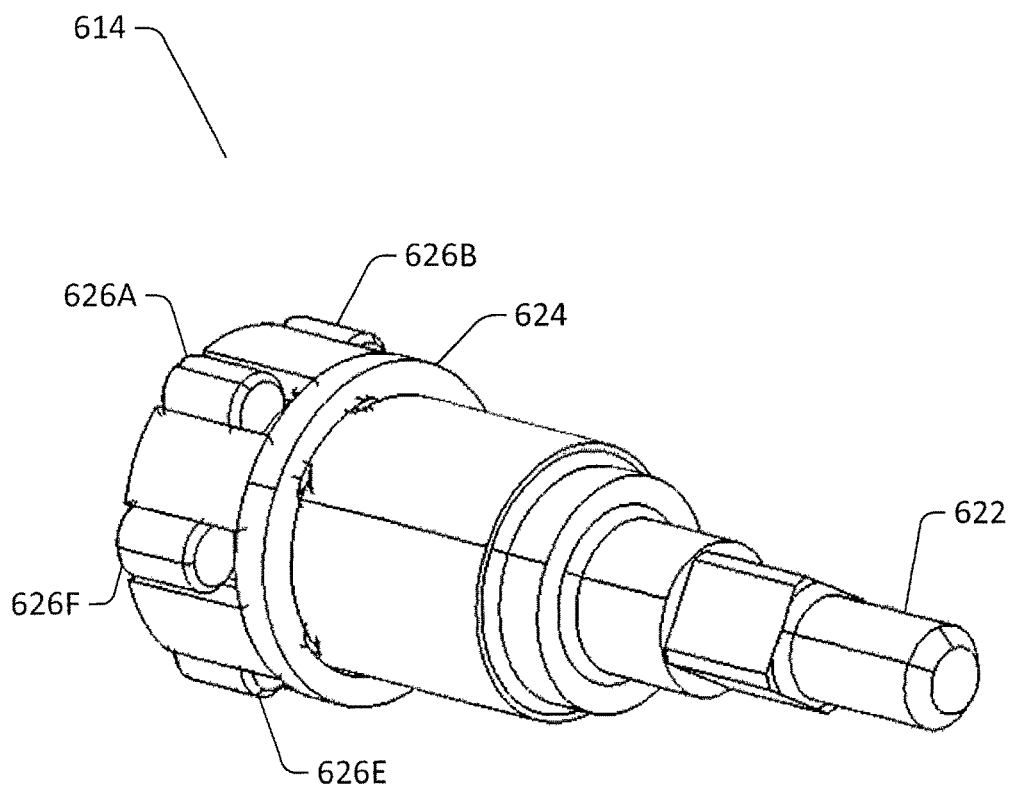

FIG. 6 shows an irreversible clutch mechanism 614 with an input 622, an intermediate connector 624, and six bearings 626A-E (with bearings 626C and 626D not shown). The input 622 may include a first end and a second end. The first end may be coupled to the rudder pedal position adjuster 304 (e.g., the adjuster drive of the rudder pedal position adjuster 304) and may be configured to receive the adjuster output from the rudder pedal position adjuster 304. The adjuster output may turn the input 622 (e.g., rotate the input 622 around a first rotational axis). The second end may include one or more teeth. The second end may be coupled to the intermediate connector 624.

The intermediate connector 624 may include one or more slots and/or cutouts configured to receive the one or more teeth of the input 622. Rotation of the input 622 (e.g., from the adjuster output) may lead to contact between the one or more teeth with the one or more slots and/or cutouts. Such contact may rotate the intermediate connector 624 (e.g., also rotate the intermediate connector 624 around the first rotational axis). Additionally, an output (not shown in FIG. 6, but shown in FIGS. 9A-11B) may include one or more slots and/or cutouts configured to receive the one or more teeth of the input 622. Rotation of the input 622 (e.g., from the adjuster output) may lead to contact between the one or more teeth of the input 622 and the walls of the one or more slots and/or cutouts of the output as well as one or more slots of the intermediate connector 624 (shown in FIG. 8 as slots 736A-C). Accordingly, the output, and the adjustment shaft 306 or any other component coupled to the output, may rotate as well, leading to adjustment in the position of the rudder pedals 302A and 302B.

The intermediate connector 624 may also include a plurality of teeth. The plurality of teeth may receive the bearings 626A-E. The bearings 626A-E may be disposed between the plurality of teeth and may rest on surfaces of the output. The surfaces may be planar or may be cam shaped. Rotation of the output from, for example, back drive, may result in the surfaces of the output forcing the bearings 626A-E against an inner wall of the irreversible clutch 414, preventing further rotation of the output and thus prevent back-drive from changing or allowing only minimal change of the position of the rudder pedals 302A and 302B.

Figure 7:
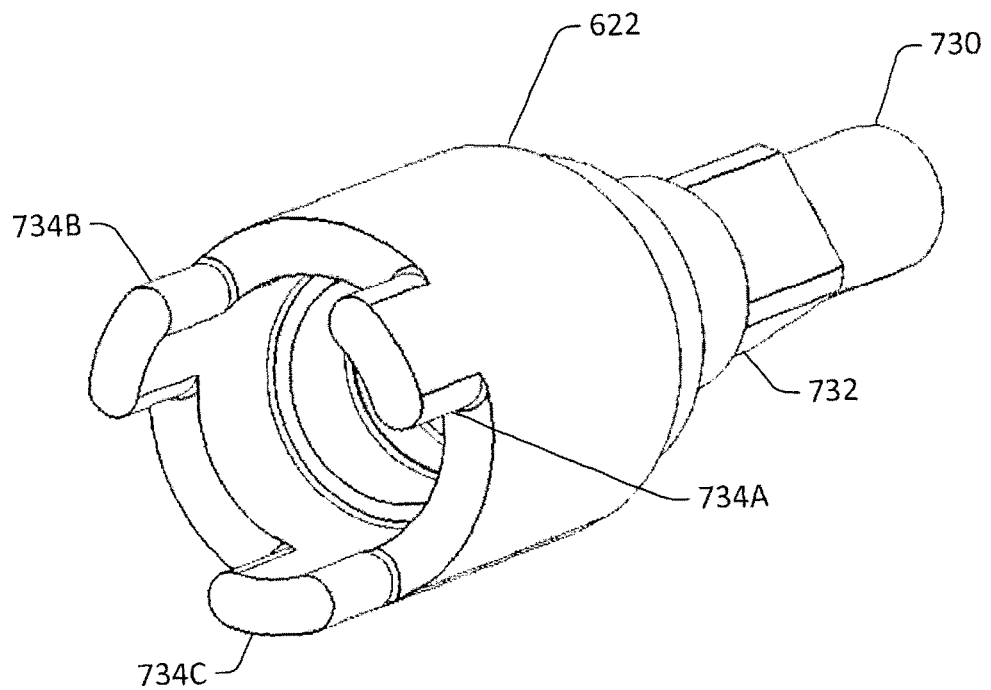

FIG. 7 shows the input 622. The input 622 may include a first end 730 that may be coupled to the rudder pedal position adjuster 304, an input body 732, and teeth 734A-C. The teeth 734A-C may be coupled to slots within the intermediate connector 624.

Figure 8:
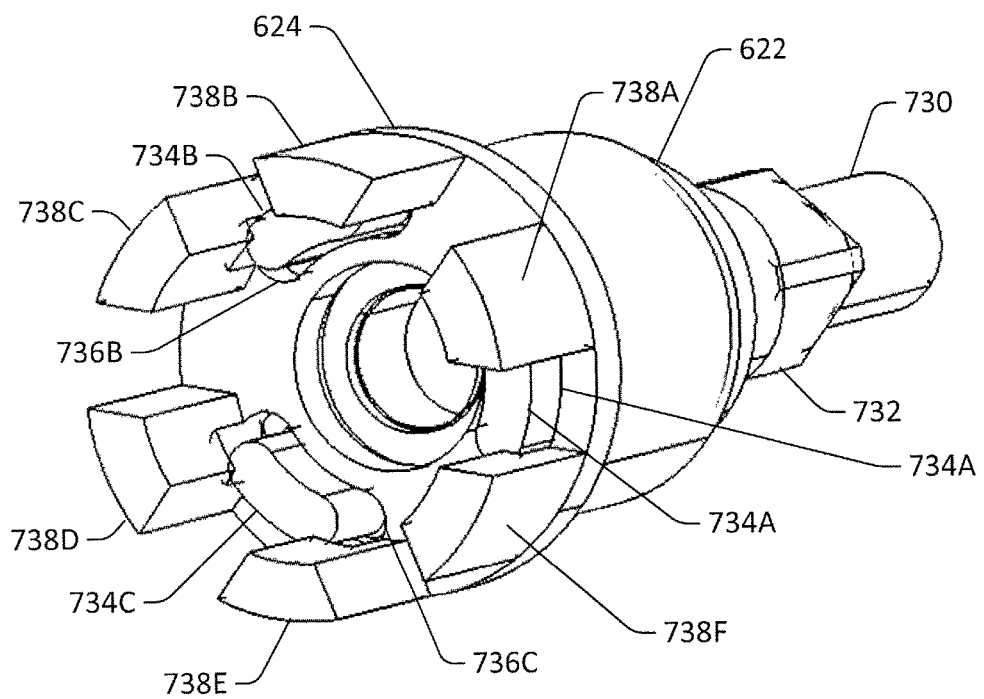

FIG. 8 shows the input 622 coupled to the intermediate connector 624. The intermediate connector 624 may include slots 736A-C and teeth 738A-F. The slots 736A-C may receive the teeth 734A-C and rotation of the input 622 may result in contact of the teeth 734A-C to the sides of the slots 736A-C. Such contact may then result in the rotation of the intermediate connector 624. The teeth 738A-F may receive the bearings 626A-F.

Figure 9A:
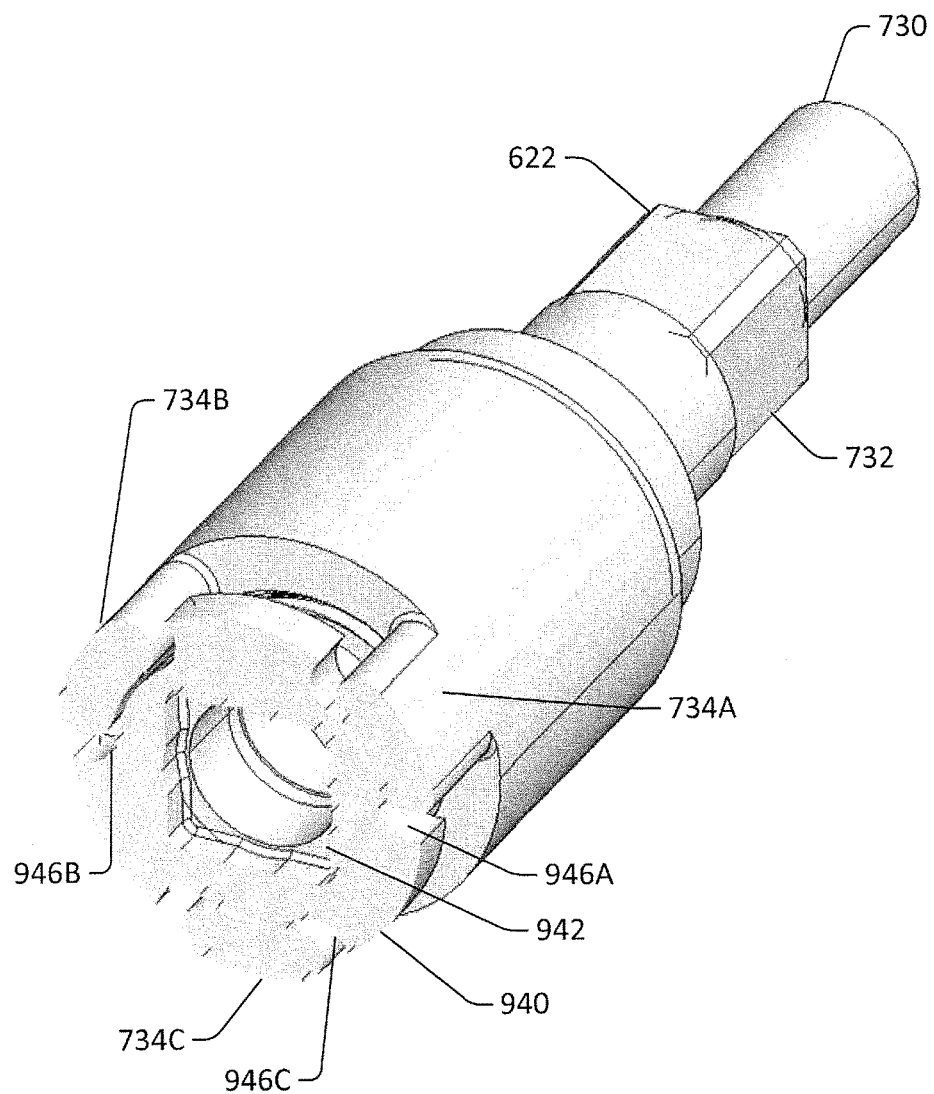

FIG. 9A shows a cutaway of an output 940 driven by the input 622. As shown in FIG. 9A, the input 622 may include the teeth 734A-C. The output 940 may include cutouts 946A-C. The cutouts 946A-C may correspond to the teeth 734A-C. As such, rotation of the input 622 may result in contact of portions of the teeth 734A-C with portions of the cutouts 946A-C as well as with portions of the slots 736A-C. Rotation of the input 622 may then be transferred to the output 940. Additionally, rotation of the input 622 and/or the slots 736A-C may allow for movement of the bearings 626A-F (shown in FIG. 9B). The bearings 626A-F may spin within the housing 516.

The output 940 may include the adjustment shaft connector 942. The adjustment shaft connector 942 may be connected to the adjustment shaft 306 and rotation of the output 940 may then rotate the adjustment shaft 306 to adjust the position of the rudder pedals 302A and 302B.

Figure 9B:
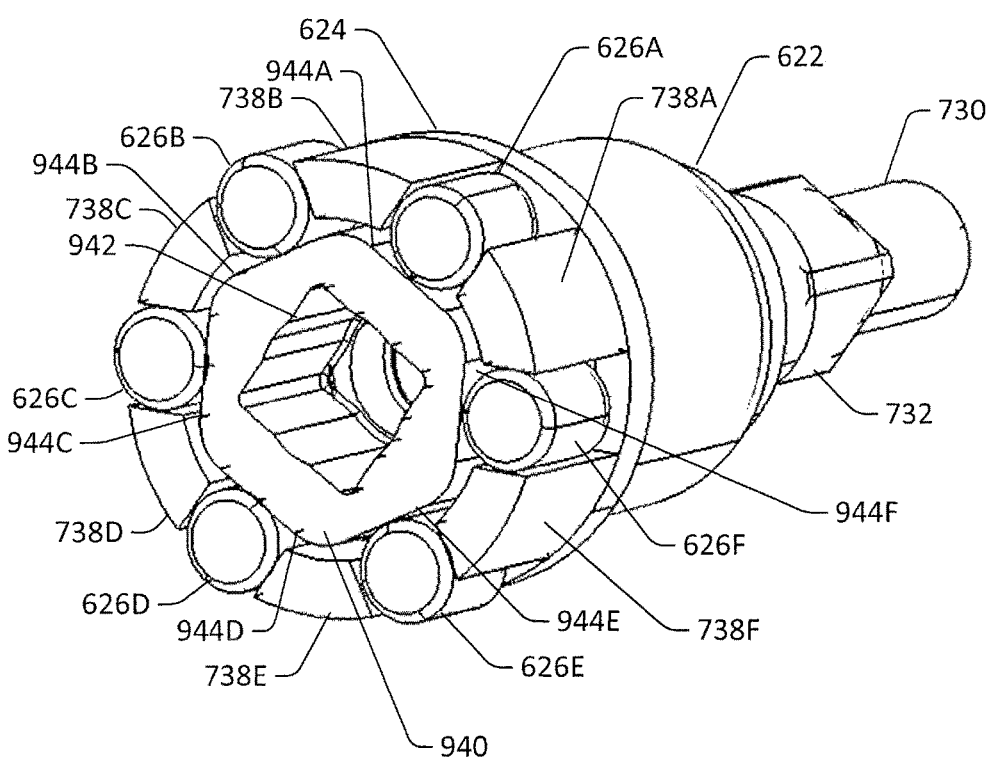
Figure 10:
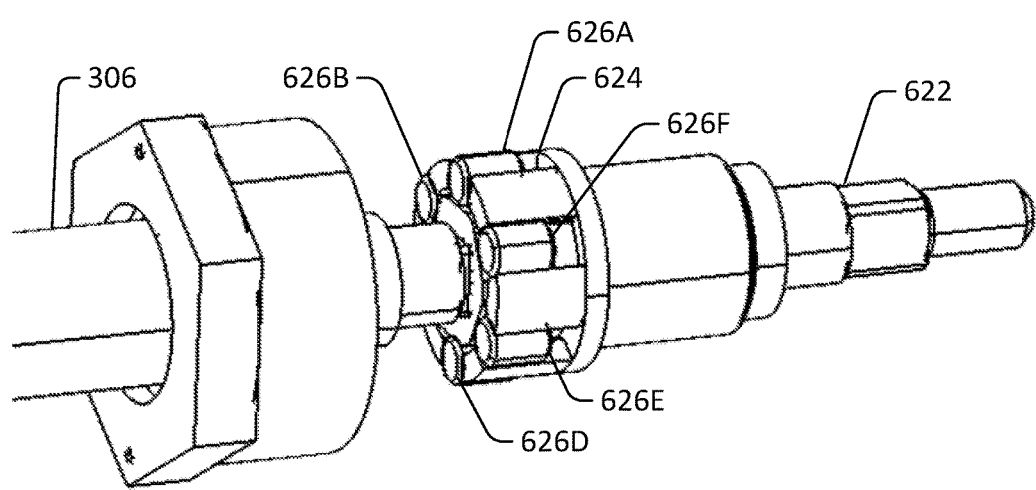

FIG. 9B shows the bearings 626A-F disposed between the teeth 738A-F of the intermediate connector 624. Rotation of the intermediate connector 624 (e.g., from rotation of the input 622 and around the first rotational axis) may lead to contact between the teeth 738A-F and the bearings 626A-F. The bearings 626A-F may then move around the first rotational axis (e.g., orbit the first rotational axis).

FIG. 9B also includes the output 940. The output 940 may include an adjustment shaft connector 942 and surfaces 944A-F. The adjustment shaft connector 942 may receive the adjustment shaft 306. Back-drive from the adjustment shaft 306 may impart torque to turn the output 940. The bearings 626A-F may be coupled to or connected to the surfaces 944A-F of the output 940. Back-drive from torque imparted to the output 940 may then impart a force to the bearings 626A-F. As the surfaces 944A-F are flat and are connected to the bearings 626A-F, attempted rotation of the output 940 may push the bearings 626A-F against an inner wall of the housing 516. Pushing bearings 626A-F against the inner wall may then lock the output 940 in place and prevent further rotation of the output 940, thus preventing back-drive from changing the position of the rudder pedals 302A and 302B.

Figure 11A:
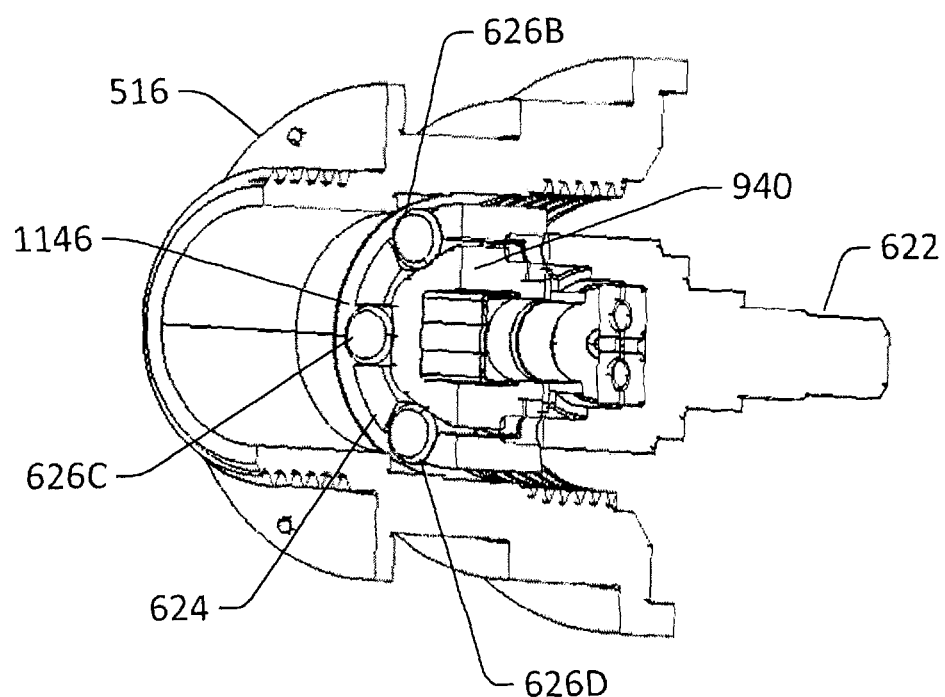
Figure 11B:
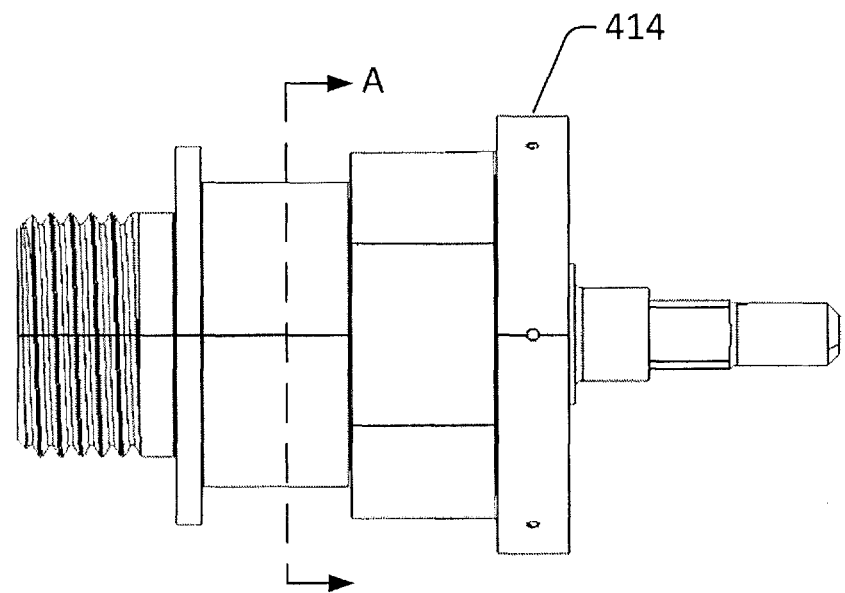
Figure 11B:
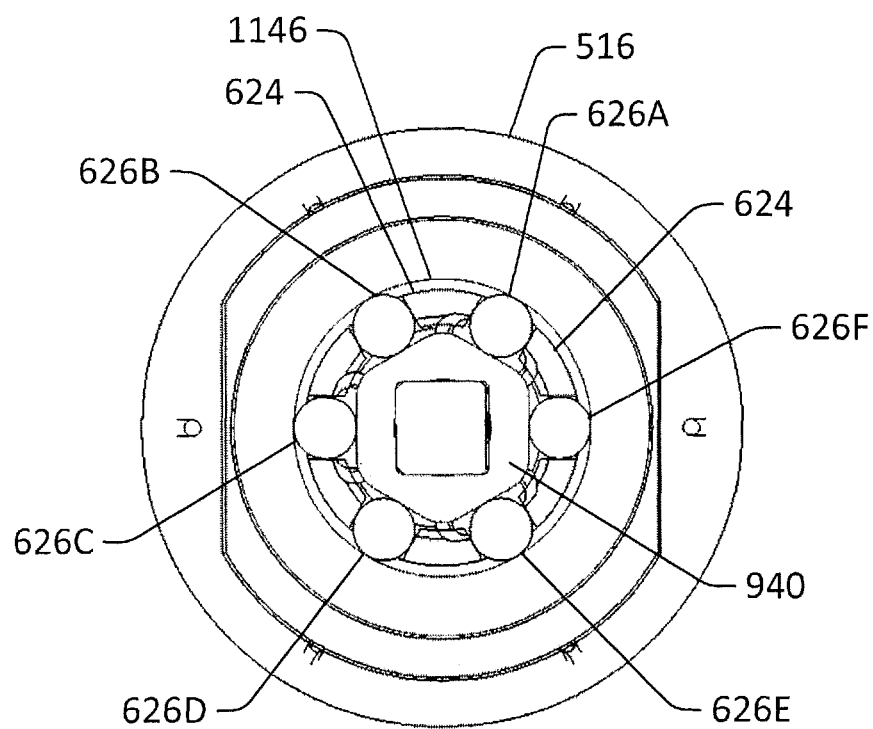

FIGS. 11A and 11B show the housing 516 in addition to the components shown in FIG. 9. FIG. 11B may be a cutaway drawing of the irreversible clutch 414 at plane A. The housing 516 may include an inner wall 1146. Rotation of the output 940 may, due to the flat surfaces 944A-F, force the bearings 626A-F against the inner wall 1146. Friction generated from forcing the bearings 626A-F against the inner wall 1146 may then prevent rotation of the output 940 and, accordingly, rotation of the adjustment shaft 306 and thus prevent changing of the position of the rudder pedals 302A and 302B due to back-drive.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus comprising:
    a position adjustment and control system comprising a rudder pedal position adjuster and configured to receive an adjustment command from a user and provide an adjuster output responsive to receiving the adjustment command; and
    an irreversible clutch comprising:
        an input end coupled to the position adjustment and control system and configured to receive the adjuster output, and
        an output end, wherein the irreversible clutch is configured to transfer the adjuster output received at the input end to the output end as a clutch output, and wherein the irreversible clutch is further configured to receive a back-drive input at the output end and prevent a transfer of the back-drive input received at the output end to the input end.

2. The apparatus of claim 1, further comprising:
    an adjustable rudder pedal assembly comprising a pedal, coupled to the output end of the irreversible clutch, and configured to receive the clutch output and, responsive to the clutch output, adjust a position of the pedal.

3. The apparatus of claim 2, further comprising an adjustment shaft disposed between the irreversible clutch and the adjustable rudder pedal assembly and comprising a first end coupled to the output end of the irreversible clutch and a second end coupled to the adjustable rudder pedal assembly and configured to transfer the clutch output to the adjustable rudder pedal assembly.

4. The apparatus of claim 3, wherein the adjustment shaft is a flexible shaft.

5. The apparatus of claim 2, wherein the adjustable rudder pedal assembly comprises a rudder pedal jackshaft, the rudder pedal jackshaft comprises an adjustment screw, and the position of the pedal is adjusted by rotating the adjustment screw responsive to receiving the clutch output.

6. The apparatus of claim 5, wherein the adjustable rudder pedal assembly further comprises a plurality of pedals and wherein receiving the back-drive input comprises rotation of the output end responsive to operation of the pedals.

7. The apparatus of claim 6, wherein the adjustable rudder pedal assembly comprises two pedals and the operation of the pedals comprises concurrent operation of the two pedals.

8. The apparatus of claim 1, wherein the irreversible clutch further comprises:
    a plurality of bearings, wherein the input end comprises a first input end configured to receive the adjuster output and a second input end comprising a plurality of input end teeth, and the output end comprises an outer area configured to couple to the plurality of bearings and a plurality of slots and/or cutouts configured to receive the plurality of input end teeth; and
    a clutch housing comprising an inner housing configured to receive the plurality of bearings.

9. The apparatus of claim 8, wherein the position adjustment and control system further comprises a controller configured to receive the adjustment command and provide a mechanical adjuster output to the rudder pedal position adjuster.

10. The apparatus of claim 8, further comprising:
an intermediate connector comprising a plurality of intermediate teeth and a plurality of intermediate slots and/or cutouts configured to couple to the plurality of input end teeth, wherein the plurality of bearings are disposed between the plurality of intermediate teeth.

11. The apparatus of claim 8, wherein the input end and the output end are configured to rotate around a centerline, and the outer area is configured to be disposed closer to the centerline than a center of mass of at least one of the bearings.

12. The apparatus of claim 1, further comprising an adjustment shaft disposed between the position adjustment and control system and the irreversible clutch and comprising a first end coupled to the position adjustment and control system and a second end coupled to the input end of the irreversible clutch and configured to transfer the adjuster output to the input end.

13. The apparatus of claim 1, wherein the rudder pedal position adjuster comprises a crank configured to receive the adjustment command and operate an adjuster drive responsive to receiving the adjustment command and be switched between an unlocked position configured to receive the adjustment command and a locked position configured to prevent movement of the adjuster drive, wherein the position adjustment and control system is configured to rotate the adjuster drive to rotate the input end, and wherein the irreversible clutch is configured to transfer the adjuster output to the output end by rotating the output end.

14. An aircraft comprising the apparatus of claim 2, wherein the aircraft comprises:
a fuselage;
a wing; and
a rudder, wherein a configuration of at least a portion of the rudder is controlled by the adjustable rudder pedal assembly.

15. A method of assembling the apparatus of claim 2, the method comprising:
disposing the irreversible clutch between the rudder pedal position adjuster and the adjustable rudder pedal assembly;
coupling the irreversible clutch to the rudder pedal position adjuster; and
coupling the irreversible clutch to the adjustable rudder pedal assembly.

16. A method of operating the apparatus of claim 1, the method comprising:
operating an adjustable rudder pedal assembly;
receiving the back-drive input with the output end of the irreversible clutch responsive to operation of the adjustable rudder pedal assembly; and
not transferring the back-drive input to the input end of the irreversible clutch.

17. The method of claim 16, wherein not transferring the back-drive input comprises:
transferring torque with the output end;
receiving the torque with a plurality of bearings;
pushing the plurality of bearings into an inner wall of a housing; and
preventing, responsive to the pushing of the plurality of bearings, movement of the plurality of bearings.

18. The method of claim 16, wherein the adjustable rudder pedal assembly comprises a plurality of pedals and operating the adjustable rudder pedal assembly comprises concurrently operating the plurality of pedals.

19. The method of claim 16, further comprising:
operating the rudder pedal position adjuster;
providing the adjuster output responsive to operating the rudder pedal position adjuster; and
transferring the adjuster output with the irreversible clutch to adjust a position of a pedal of the adjustable rudder pedal assembly.

20. The method of claim 19, wherein transferring the adjuster output comprises:
receiving the adjuster output with the input end of the irreversible clutch;
outputting the clutch output with the output end of the irreversible clutch responsive to receiving the adjuster output with the input end; and
receiving the clutch output with the adjustable rudder pedal assembly.

* * * * *

UNITED STATES PATENT AND TRADEMARK OFFICE
CERTIFICATE OF CORRECTION

PATENT NO. : 10,011,347 B2  
APPLICATION NO. : 15/194437  
DATED : July 3, 2018  
INVENTOR(S) : David J. Zimmer and Yevgeniy M. Gisin Page 1 of 1

It is certified that error appears in the above-identified patent and that said Letters Patent is hereby corrected as shown below:

On the Title Page

Item (72) Inventors: change "David J. Zimmer, Kinkland, WA (US);" to -- David J. Zimmer, Kirkland, WA (US); --

Signed and Sealed this
Eleventh Day of September, 2018

Andrei Iancu
*Director of the United States Patent and Trademark Office*